United States Patent
Nakahara et al.

(10) Patent No.: US 6,552,741 B2
(45) Date of Patent: Apr. 22, 2003

(54) OPTICAL SCANNING DEVICE, IMAGE SCANNING METHOD AND PHOTOGRAPHIC PROCESSING DEVICE

(75) Inventors: Fumihiro Nakahara, Wakayama (JP); Jun Hirooka, Wakayama (JP); Yasutaka Kayama, Wakayama (JP); Hirofumi Hayashi, Wakayama (JP)

(73) Assignee: Noritsu Koki Co., Ltd., Wakayama (JP)

(*) Notice: Subject to any disclaimer, the term of this patent is extended or adjusted under 35 U.S.C. 154(b) by 0 days.

(21) Appl. No.: 09/847,315

(22) Filed: May 3, 2001

(65) Prior Publication Data

US 2001/0040618 A1 Nov. 15, 2001

(30) Foreign Application Priority Data

May 11, 2000 (JP) .......................................... 2000-138598

(51) Int. Cl.[7] .............................. B41J 2/47; B41J 27/00
(52) U.S. Cl. ....................................... 347/239; 347/244
(58) Field of Search ................................. 347/232, 233, 347/234, 235, 239, 244, 250, 255, 259

(56) References Cited

U.S. PATENT DOCUMENTS 5,126,756 A * 6/1992 Ban .......................... 347/232
5,754,214 A * 5/1998 Okino ....................... 347/229
6,141,030 A * 10/2000 Fujita et al. ............... 347/233

* cited by examiner

Primary Examiner—Hai Pham
(74) Attorney, Agent, or Firm—Nixon & Vanderhye, P.C.; Frank P. Presta

(57) ABSTRACT

An optical scanning device which performs an exposing operation with respect to a photosensitive material such as a printing sheet, etc., by scanning with laser beams in respective colors modulated according to image data is arranged so as to modulate light beams in respective colors projected from respective light sources of a red LD, a green-color SHG laser unit and a blue-color SHG laser unit by AOMs according to image data. Then, the clock frequency control section adjusts an exposure scanning clock for each of the AOM drivers for driving these AOMs individually. It is therefore possible to suppress an aberration in color caused by a shift in light beams in respective colors which are to be projected onto the same target position.

25 Claims, 7 Drawing Sheets

F I G . 2
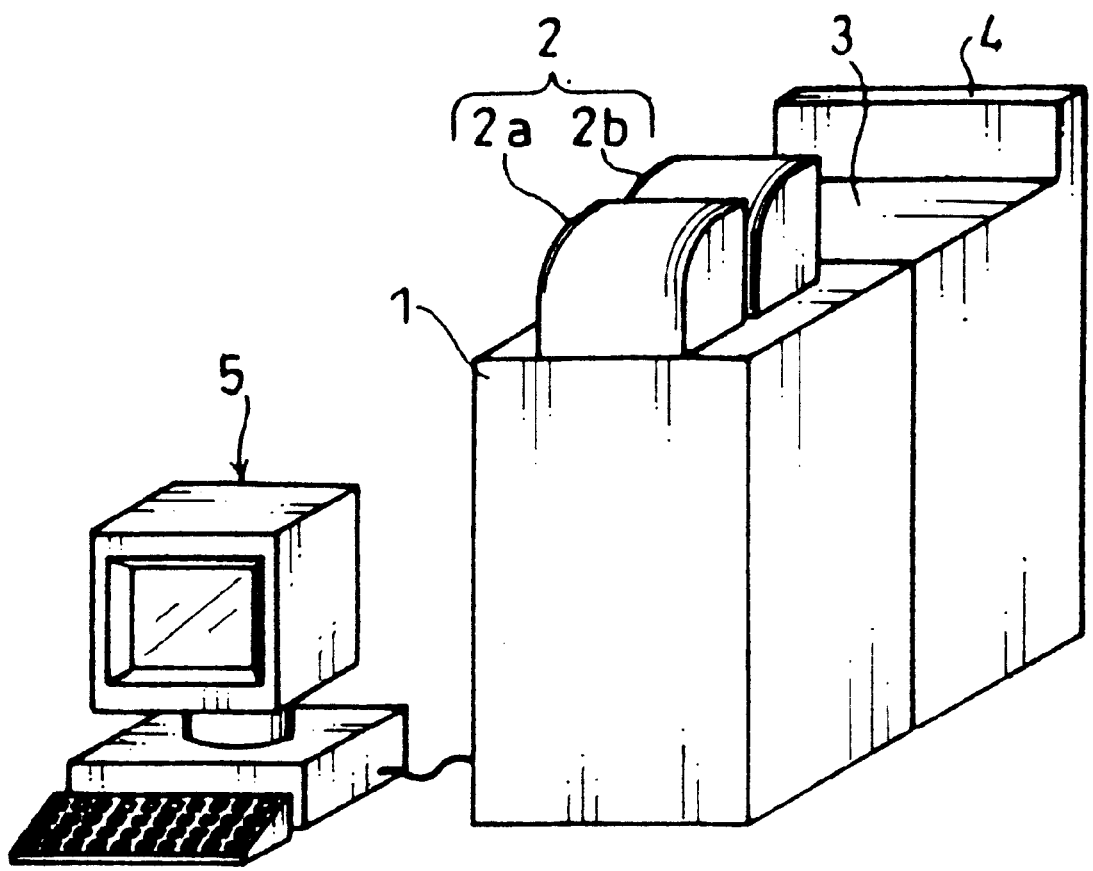

OPTICAL SCANNING DEVICE, IMAGE SCANNING METHOD AND PHOTOGRAPHIC PROCESSING DEVICE

FIELD OF THE INVENTION

The present invention relates to an optical scanning device, an optical scanning method and a photographic processing device which perform an exposing operation by scanning a photoconductive material such as a printing sheet, etc., with laser beams modulated according to image data.

BACKGROUND OF THE INVENTION

Conventionally, for the printing of a photograph, an analog exposure is adopted wherein a light beam is projected onto a photographic film, and light having passed through the photographic film is projected onto a printing sheet, thereby printing the photograph. In recent years, a digital exposure is also adopted for the printing of a photograph, wherein based on digital image data obtained by reading an image on a photographic film by a scanner, etc., or digital image data taken by a digital camera, light beam in monochrome color of red, blue or green, is projected onto a printing sheet for each pixel, thereby printing the image.

For the foregoing digital exposure, various methods have been proposed, examples of which include: a structure wherein an exposing operation is performed by scanning a printing sheet with a laser beam modulated according to image data. The image printing device of the foregoing structure includes light sources for generating laser beams in blue, green and red, and a printing operation is performed in the following procedure. First, laser beams in respective colors are modulated according to digital image data as input. The laser beams as modulated are then deflected by a deflecting system such as a polygon mirror, etc., in a main scanning direction, and the resulting deflected light beams are projected onto a printing sheet via an optical system such as an fθ lens. In the meantime, an exposing operation is performed by scanning with respect to the printing sheet being moved in a sub-scanning direction, thereby printing a two-dimensional color image onto the printing sheet.

As described, in the structure of projecting laser beams in respective colors onto the printing sheet, the laser beam in each color passes through a fθ-lens. Here, a lens optical system such as the fθ-lens is made of a material such as glass, etc., whose refractive index varies according to a wavelength of light transmitted therethrough. Therefore, when adopting the optical system of the foregoing structure, laser beams in respective colors incident on the optical system from the same direction are output therefrom in slightly different directions. The foregoing phenomenon that light beams in respective colors which are to be projected onto the same target position are displaced is known as "aberration in color".

Therefore, as in the foregoing structure of projecting onto the printing sheet, laser beams in respective colors incident on the same fθ-lens, problems arise due to the aberration in color in that the resulting print image becomes blur, or unwanted color appears in the print image. The foregoing problem of aberration in color can be suppressed to some extent by adopting the fθ-lens of highly sophisticated performance; however, the use of such fθ-lens results in an increase in an overall price of a device, besides, the problem of aberration in color cannot be eliminated completely.

SUMMARY OF THE INVENTION

An object of the present invention is to provide an optical scanning device, an optical scanning method, and a photographic processing device which perform an exposing operation by scanning a photosensitive material such as a printing sheet, etc., with laser beams modulated according to image data without a problem of aberration in color caused by a shift in light beams in respective colors from the same target position.

In order to achieve the foregoing object, an optical scanning device which performs an exposing operation by scanning with respect to a photosensitive material being moved relatively is characterized by including:

a plurality of light sources for projecting light beams respectively having different wavelengths;

a plurality of light beam modulation means for modulating the light beams emitted from the light sources respectively according to image data;

timing control means for controlling a modulation timing for each of the plurality of light beam modulation means;

deflecting means for deflecting the light beams modulated by the plurality of light beam modulation means in a main scanning direction; and optical means for converging light beams emitted from the deflecting means onto the photosensitive material, wherein the timing control means controls a modulation timing for each of the plurality of light beam modulation means individually.

According to the foregoing arrangement, a plurality of light beams respectively having different wavelengths as emitted from the plurality of light sources are independently modulated by the plurality of light beam modulation means according to image data, and the resulting light beams are then deflected by the deflecting means in the main scanning direction, and is focused on the photosensitive material via the optical means, thereby performing an exposing operation by scanning. Further, by the timing control means, a modulation timing by the light beam modulation means is individually controlled for each of the plurality of light beam modulation means. Therefore, even in the case where the projected positions of the light beams in respective colors corresponding to the same pixel are shifted from the target position on the photosensitive material due to, for example, differences in refractive index by optical means among the light beams, the timing control means adjusts a modulation timing for each optical beam modulation means, and it is therefore possible to adjust the respective projection positions of the light beams in respective colors. As a result, a quality image which is free from a shift in color can be exposed on a photosensitive material.

In order to achieve the foregoing object, an optical scanning method for an optical scanning device which performs an exposing operation by scanning with respect to a photosensitive material being moved relatively, which includes i) a plurality of light sources for projecting light beams having different wavelengths respectively; ii) a plurality of light beam modulation means for modulating the light beams emitted from the light sources respectively according to image data; iii) deflecting means for deflecting the light beams modulated by the plurality of light beam modulation means respectively in a main scanning direction; and iv) optical means for converging a light beam emitted from the deflecting means onto the photosensitive material, is characterized in that the plurality of light beam modulation means modulate respective light beams at different modulation timings.

According to the optical scanning device adopted in the foregoing method, a plurality of light beams respectively having different wavelengths as emitted from the plurality of light sources are independently modulated by the plurality of light beam modulation means according to image data, and the resulting light beams are then deflected by the deflecting means in the main scanning direction, and is focused on the photosensitive material via the optical means, thereby performing an exposing operation by scanning. Further, the respective modulation timings for the light beam modulation means are controlled by the timing control means for each of the plurality of light beam modulation means individually. Therefore, even when areas irradiated with the light beams corresponding to the same pixel are displaced from the target position on the photosensitive material due to differences in refractive index among respective light beams in the optical means, the timing control means adjusts a modulation timing for each optical beam modulation means, and it is therefore possible to adjust a projection area of a light beam in each color. As a result, a quality image which is free from aberration in color can be exposed on the photosensitive material.

In order to achieve the foregoing object, an electrophotographic processing device, includes:

an optical scanning device which is provided with i) a plurality of light sources for projecting light beams having different wavelengths respectively; ii) a plurality of light beam modulation means for modulating the light beams emitted from the light sources respectively according to image data; iii) deflecting means for deflecting the light beams modulated by the plurality of light beam modulation means respectively in a main scanning direction; and iv) optical means for converging a light beam emitted from the deflecting means onto the photosensitive material, wherein the timing control means individually controls respective modulation timings for the plurality of light beam modulation means;

a developing section which performs a developing operation with respect to the photosensitive material to which a printing operation has been applied by the optical scanning device using a developing solution; and a drying section for drying the developing material to which a developing operation has been applied by the developing section.

According to the foregoing arrangement, printing, developing and drying processes to be performed with respect to a photosensitive material can be unitary performed successively, and it is therefore possible to successively perform photographic processing of a plurality of photographs without requiring the user to perform troublesome operations.

For a fuller understanding of the nature and advantages of the invention, reference should be made to the ensuing detailed description taken in conjunction with the accompanying drawings.

BRIEF DESCRIPTION OF THE DRAWINGS

FIG. 2 is a perspective view illustrating a schematic structure of the photographic processing device of FIG. 1.

DESCRIPTION OF THE EMBODIMENT

The following will explain one embodiment of the present invention with reference to FIGS. 1 to 8.

In the present embodiment, a digital photographic printer is adopted as a photographic processing device, wherein an original image is printed on a photosensitive material by performing printing, developing, and drying processes with respect to a photosensitive material based on image data of an original image.

FIG. 2 is an explanatory view illustrating a structure of the printing processing device. As illustrated in FIG. 2, the photographic processing device includes an exposing section 1, a printing sheet storing section 2, a developing section 3, a drying section 4, and a PC (Personal Computer) 5.

The printing sheet storing section 2 stores therein printing sheets as a photosensitive material, and when printing, supplies a printing sheet to the exposing section 1. The exposing section 1 performs a printing operation of an image by exposing the printing sheet as supplied from the printing sheet storing section 2 by scanning. For the exposing section 1, detailed explanations will be given later.

The developing section 3 performs a developing operation with respect to the printing sheet having an image printed thereon. Specifically, the developing operation is performed with an application of various kinds of processing solution to the printing sheet being moved. The drying section 4 is provided for drying the printing sheet which has gone through the developing process. The PC 5 functions as a control unit for controlling various operations in the photographic processing device. The PC 5 is also provided with the function of storing image data of an original image and the function of processing the image data.

Figure 3:
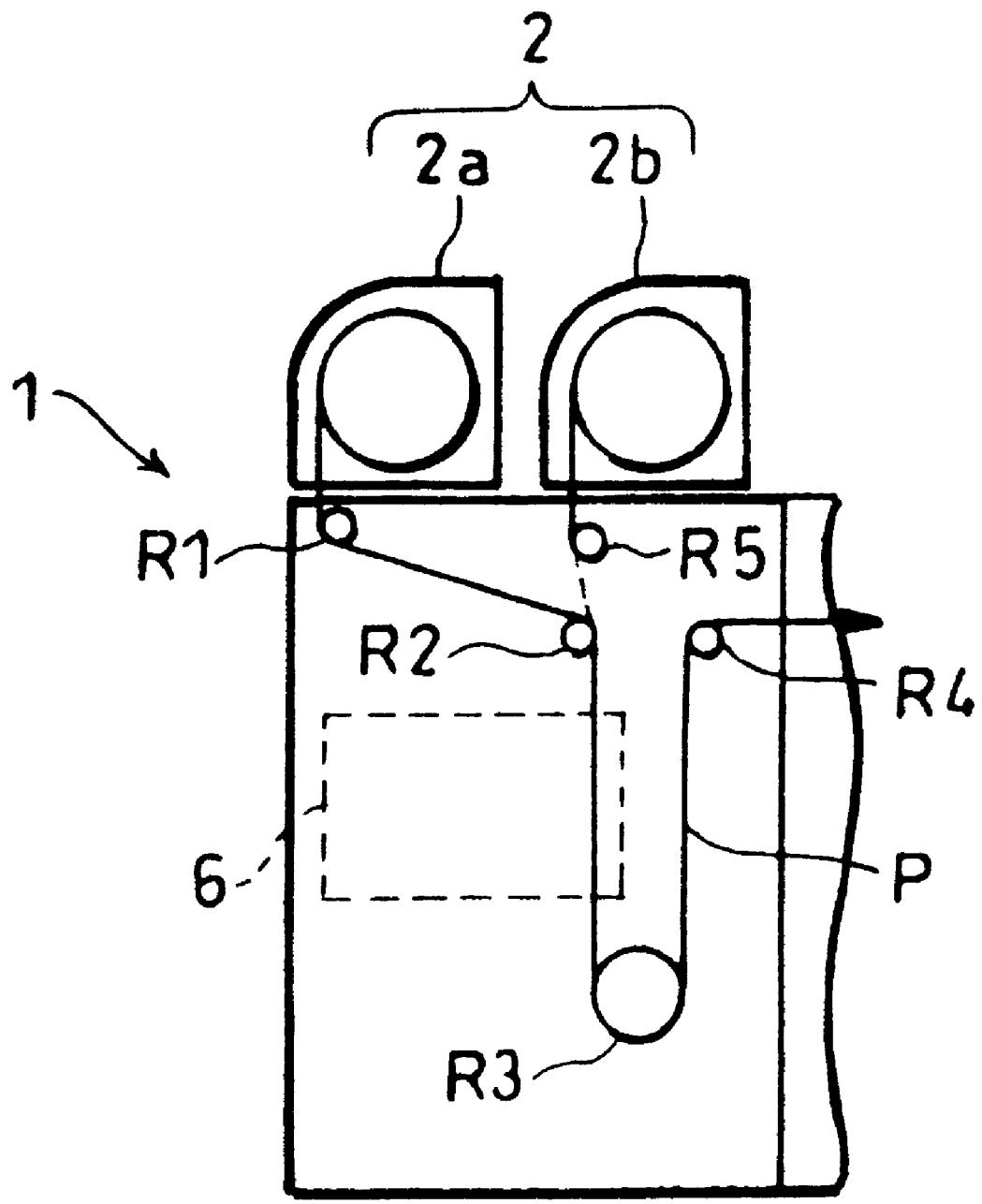
FIG. 3 is an explanatory view illustrating a schematic structure of an exposing section and a printing sheet storing section of the photographic processing device of FIG. 1.

Next, the structure of the exposing section 1 will be explained. FIG. 3 is an explanatory view illustrating the structure of the exposing section 1 and the printing sheet storing section 2. As illustrated in FIG. 3, the printing sheet storing section 2 provided above the exposing section 1 has paper magazines 2a and 2b for storing roll-shaped printing sheets P. The paper magazines 2a and 2b respectively store therein printing sheets P of different sizes, and it is arranged so as to switch the sheet P to be supplied according to the size of an output image as desired by the user. As described, the exposing section 1 performs an exposing operation by scanning with respect to the printing sheet P as supplied from the printing sheet storing section 2. This exposing section 1 includes a printing section 6 and transport rollers R1 to R5.

The printing section 6 is provided for projecting a light beam for use in exposing the printing sheet P transported by the transport rollers R1 to R5. These transport rollers R1 to R5 are provided for feeding the printing sheet P as supplied from the printing sheet storing section 2 to the developing section 3 via the printing section 6.

Next, the structure of the printing section 6 will be explained in reference to FIG. 4 which is an explanatory view illustrating the schematic structure of the printing section 6. The printing section 6 includes light source sections 7R, 7G and 7B, a scanning section 8 and a transporting section 9.

[The Structure of the Light Source Section]

The light source section 7R includes a red LD (Laser Diode) (light source) 10R, a lens group 11R, an acousto-optic modulation element (AOM: Acousto-Optic Modulator) (light beam modulation means) 12R, a light modulating section 13R, and a mirror 14R. These lens group 11R, the AOM 12R, and the light modulating section 13R are provided on the optical axis extending from the red LD 10R to the mirror 14R in this order.

The red LD 10R is a semiconductor laser for projecting a laser beam of having a wavelength for a red component. The lens group 11R is provided for shaping a red laser beam as emitted from the red LD 10 to be directed to an incident light opening of the following AOM 12R.

The AOM 12R is a light modulating unit utilizing the diffraction phenomenon wherein the distribution of the refractive index of the refraction generated in a transparent medium by the sonic wave functions as a phase diffraction grating, i.e., a so-called acousto-optic diffraction phenomenon. The ACM 12R modulates the light intensity of diffracted light by modulating the intensity of the ultrasonic wave to be applied. To this AOM 12R, an AOM driver 15R is connected from which a high-frequency signal whose amplitude is modulated according to the image data is input.

When a high-frequency signal is input to the AOM 12R from the AOM driver 15R, the ultrasonic wave according to the high-frequency signal is propagated in the acousto-optic medium. When a laser beam passes through the foregoing acousto-optic medium, by the acousto-optic effect, the light is diffracted, and a laser beam having an intensity according to the amplitude of the high-frequency signal is emitted from the AOM 12R as a diffracted light beam.

The light modulating section 13R is provided for adjusting an intensity of a laser beam emitted from the AOM 12R, which has been modulated according to the image data. This light modulating section 13R is composed of, for example, an ND filter, a rotary plate with a plurality of openings of different sizes. The light emitting element such as a semiconductor laser, a solid laser, etc., has a predetermined range for the luminous energy required for emitting light under stable condition. Therefore, by adjusting the luminous energy by the light modulating section 13R, it is therefore possible to perform an exposing operation with the luminous energy required for realizing a wide dynamic range according to the coloring characteristics of the printing sheet.

The mirror 14R is provided for reflecting the laser beam emitted from the light modulating section 13R to the direction of the scanning section 8. The structure of this mirror 14R is not particularly limited as long as a red-color component of the light beam incident thereto is reflected therefrom. In the structure adopted in the present embodiment, a red light beam having only a wavelength for a red-color component is incident onto the mirror 14R, and therefore, a total reflection mirror which reflects incident light in all directions is adopted.

On the other hand, the light source section 7G includes a green-color SHG (Second Harmonic Generation) laser unit (light source) 10G, an AOM (light beam modulating means) 12G, a light modulating section 13G, and a dichroic mirror 14G. The AOM 12G and the light modulating section 13G are provided on an optical axis extending from the green-color SHG laser unit 10G to the dichroic mirror 14G.

The green-color SHG laser unit 10G functions as a light source for projecting a laser beam having a wavelength for a green-color component. This green-color SHG laser unit 10G stores therein a wavelength varying section (not shown) which is composed of a solid laser such as a YAG laser, a secondary harmonic generating section for taking out a secondary harmonic from the laser beam emitted from the solid laser. For example, in the case of projecting a laser beam having a wavelength of 1064 nm from the YAG laser, a laser beam having a wavelength of 532 nm (green-color component) is generated from the secondary harmonic generating section, and the laser beam of this secondary harmonic component is emitted therefrom. In the present embodiment, the solid laser is adopted as means for projecting basic laser beams; however, the light emitting means of the present invention is not limited to the solid laser, and, for example, an LD may be adopted as well.

The light source section 7R includes the lens group 11R provided between the red LD 10R and the AOM 12R. On the other hand, the light source section 7G does not have such lens group but has a structure of a similar function to the lens group 11R in the green-color SHG laser unit 10G.

The AOM 12G and the light modulating section 13G have the same structures as the AOM 12R and the light modulating section 13R of the light source section 7R explained earlier. Namely, the AOM 12G is provided for modulating the laser beam projected from the green-color SHG laser unit 10G according to the image data, and the light modulating section 13G is provided for adjusting an amount of light of the laser beam projected from the AOM 12G.

The dichroic mirror 14G is provided for reflecting the laser beam of a green-color component projected from the light modulating section 13G to the direction of the scanning section 8. This dichroic mirror 14G reflects only the light having a wavelength for a green-color component, and allows the light beam of other components to pass therethrough. The dichroic mirror 14G is provided along an optical path 14G in the light source section 7R extending from the mirror 14R to the scanning section 8. The red color component of the light beam reflected from the mirror 14R passes through the dichroic mirror 14G, and reaches the scanning section 8. Namely, the light beam which travels from the dichroic mirror 14G to the scanning section 8 includes a red-color component laser beam and a green-color component laser beam which have been modulated according to the image data.

The light source section 7B has a similar structure as the light source section 7G, and includes a blue-color SHG laser unit (light source) 10B, an AOM (light beam modulating means) 12B, a light modulating section 13B, and a dichroic mirror 14B. The AOM 12B and the light modulating section 13B are provided on an optical axis extending from the blue-color SHG laser unit 10B to the dichroic mirror 14B in this order.

The blue-color SHG laser unit 10B functions as a light source for projecting a laser beam having a wavelength for a blue-color component, and has a similar structure to the green-color SHG laser unit 10G. The AOM 12B and the light modulating section 13B have the same structures as the AOMs 12R and 12G and the light modulating sections 13R and 13G as explained in the light source section 7R and 7G explained earlier. Namely, the AOM 12B is provided for modulating a laser beam emitted from the blue-color SHG laser unit 10B according to the image data, and the light modulating unit 13B is provided for adjusting an amount of light of a laser beam emitted from the AOM 12B.

The dichroic mirror 14B is provided for reflecting a laser beam of a blue-color component projected from the light modulating unit 13B to the direction of the scanning section 8. This dichroic mirror 14B reflects only the light having a wavelength for a blue-color component, and allows the light beams of other components to pass therethrough. This dichroic mirror 14B is provided in an optical path extending from the mirror 14R and the dichroic mirror 14G to the scanning section 8, and the laser beam of a red-color component as reflected from the mirror 14R and the laser beam of a green-color component having passed through the dichroic mirror 14B reach the scanning section 8. Namely, a light beam which travels from the dichroic mirror 14B to the scanning section 8 is composed of a red-color component, a green-color component and a blue-color component as modulated according to the image data.

As described, in the present embodiment, as the structure of modulating intensity of a laser beam of each component, i.e., as the light beam modulating means, the AOMs 12R, 123 and 12G are adopted; however, the present invention is not limited to the foregoing structure, and any structure which permits an intensity modulation of a laser beam of each color component to modulate may be adopted. For example, in replace of the foregoing AOMS, elector-optical modulation elements (EOMS), magneto-optical modulation elements (MOMs) may be adopted for the intensity modulation of the laser beam.

For example, the light source section 7R may be arranged so as to perform an intensity modulation of a laser beam by directly modulating the output from the red LD 10R without using the AOM 12R. In this case, the structure for adjusting the output from the red LD 10R according to the image data corresponds to the foregoing light beam modulating means. Needless to mention, the foregoing structure is applicable to not only the red LD but also to an LD which emits a laser beam in other color component.

[The Structure of the Scanning Section]

The scanning section 8 includes a reflective mirror 16, a cylindrical lens 17, a polygon mirror (deflecting means) 18, and an fθ-lens (optical means) 20. The cylindrical lens 17 is provided in an optical axis extending from the reflective mirror 16 to the polygon mirror 18. The scanning section 8 further includes the fθ-lens 20 provided in an optical path extending from the polygon mirror 18 to the printing sheet P.

The reflective mirror 16 is provided for reflecting laser beams of a red-color, green-color and blue-color components as reflected from the mirror 14R, and dichroic mirrors 14G and 14B of the light source sections 7R, 7G and 7B to the polygon mirror 18.

The cylindrical lens 17 is provided for focusing a laser beam as reflected from the reflective mirror 16 onto the reflective surface of the polygon mirror 18 in the sub-scanning direction. This cylindrical lens 17 is provided for compensating for an error in an inclination of the reflective surface of the polygon mirror 18 (an error due to a shift in the normal direction of the reflective surface from a normal main scanning surface).

When an error occurs in the inclination of the reflective surface of the polygon mirror 18, an incident position of the laser beam on the printing sheet P is greatly varied, resulting in an uneven pitch in the print image. In response, according to the structure of the present embodiment as described earlier, the laser beam is once focused by the cylindrical lens 17 onto the reflective surface of the polygon mirror 18 in the sub-scanning direction, while the fθ-lens 20 and the printing sheet P are disposed such that the laser beam as reflected from the polygon mirror 18 is focused again on the printing sheet P after being transmitted through the fθ-lens 20. This is an arrangement in which the reflective surface of the polygon mirror 18 and the printing sheet P are optically conjugated, so as to form the image of the beam on the same position on the printing sheet P, even if the beam is deflected in sub-scanning direction by the inclination of the reflective surface of the polygon mirror 19. In other words, an image can be formed on the same position on the printing sheet P even when a light beam is emitted from a certain point of the reflective surface of the polygon mirror 18 in arbitrary directions within a certain range.

The polygon mirror 18 is a rotating body composed of a plurality of reflective surfaces which form a regular polygon. The polygon mirror 18 is drive by a polygon driver 19 to rotate. The laser beam, which is projected from the reflective mirror 16 via the cylindrical lens 17, is reflected by one of the reflective surfaces of the polygon mirror 18 towards the printing sheet P. Then, the reflecting direction of the laser beam from the polygon mirror 18 shifts in the main scanning direction in accordance with the rotation of the polygon mirror 18. Specifically, when the laser beam has been reflected from one reflective surface with the rotation of the polygon mirror 18, the projection of the laser beam is shifted to the next reflective surface adjacent to the above reflective surface, and the reflecting direction of the laser beam whereby shifts in the main scanning direction within the same range. According to the foregoing structure, one reflective surface is used for the scanning of one scanning line, and the next adjacent reflective surface is used for the scanning of the next scanning line. It is therefore possible to significantly reduce a time lag between adjacent scanning lines in the sub-scanning direction.

The fθ-lens 20 is an optical system composed of a plurality of lens for compensating for a distortion of the image occurred around both ends of the surface scanned with the laser beam projected onto the printing sheet P from the polygon mirror 18. This distortion in image occurred around both ends of the surface subjected to scanning is caused by the differences in length of optical paths extending from the polygon mirror 18 to the printing sheet P.

Further, a synchronous sensor 21A and a mirror 21B are provided outside the main scanning region of the laser beam to be projected from the polygon mirror 18 onto the printing sheet P. The mirror 21 B is positioned just outside the main scanning region in a direction of the starting point of the main scanning, with respect to the polygon mirror 18. In other words, the laser beam as reflected from one of the reflective surfaces of the polygon mirror 18 is first incident onto the mirror 21B, and immediately after that, the printing sheet P is subjected to scanning in the main scanning direction.

The reflective surface of the mirror 21B is set in a direction such that the laser beam reflected from the polygon mirror 18 is incident on the synchronous sensor 21A. Further, the optical path extending from the polygon mirror 18 to the synchronous sensor 21A via the mirror 21B is formed in length substantially equal to the length of the optical path extending from the polygon mirror 18 to the starting point of the main scanning on the printing sheet P.

The synchronous sensor 21A is a photosensor for detecting a laser beam. When the laser beam is projected onto the synchronous sensor 21A from the polygon mirror 18 via the mirror 21B, the synchronous sensor 21A transmits a signal to a control section (not shown) spontaneously with timing of the projection. Thus, a timing at which a scanning operation is performed on the printing sheet P can be recognized precisely based on an output from the synchronous sensor 21A.

[The Structure of the Transport Section]

The transport section 9 is mainly composed of transport rollers 22, a micro step motor 23, and a micro step driver 24. The transport rollers 22 are provided for transporting the printing sheet P. In the example structure illustrated in FIG. 4, the printing sheet P is transported by the transport rollers 22 in a direction vertical to the sheet surface.

The micro step motor 23 which is a type of a stepping motor is provided for driving the transport rollers 22. This micro step motor 23 is capable of performing very precise control of a rotating angle.

The micro step driver 24 is provided for driving the micro step motor 23 to rotate. This micro step motor 24 controls the transport speed of the printing sheet P in the sub-scanning direction to be in synchronous with the main scanning timing under the control of a control section. In should be noted here that the main scanning timing is recognized based on the signal from the synchronous sensor 21.

As described earlier, the printing section 6 of the present embodiment performs an exposing operation by projecting the laser beams in respective colors, red, green, and blue as modulated in accordance with the image data while being shifted in the main scanning direction onto the printing sheet P being moved in the sub scanning direction, and a two-dimensional image is whereby printed on the printing sheet P.

Figure 5:
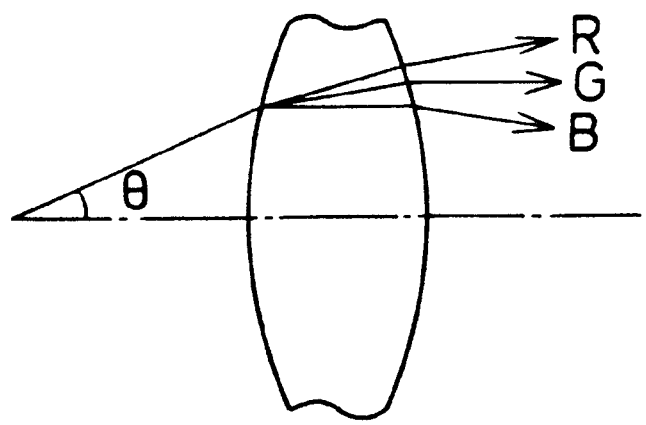
FIG. 5 is an explanatory view illustrating diffraction of light beams in respective colors with respect to a generally used lens.

Next, the refraction of the laser beam in respective colors when passing through the fθ-lens 20 will be explained. In general, a material such as glass, etc., used in the optical components including the fθ-lens 20, has a variable refractive index depending on a wavelength of a light beam transmitted therethrough. FIG. 5 illustrates refraction of the light beams in respective colors with respect to a generally used lens. As shown in FIG. 5, the light beams in respective colors R, G, B, incident on the lens at a predetermined angle θ with respect to an optical axis of the lens, are output from the lens in different directions, respectively.

Figure 4:
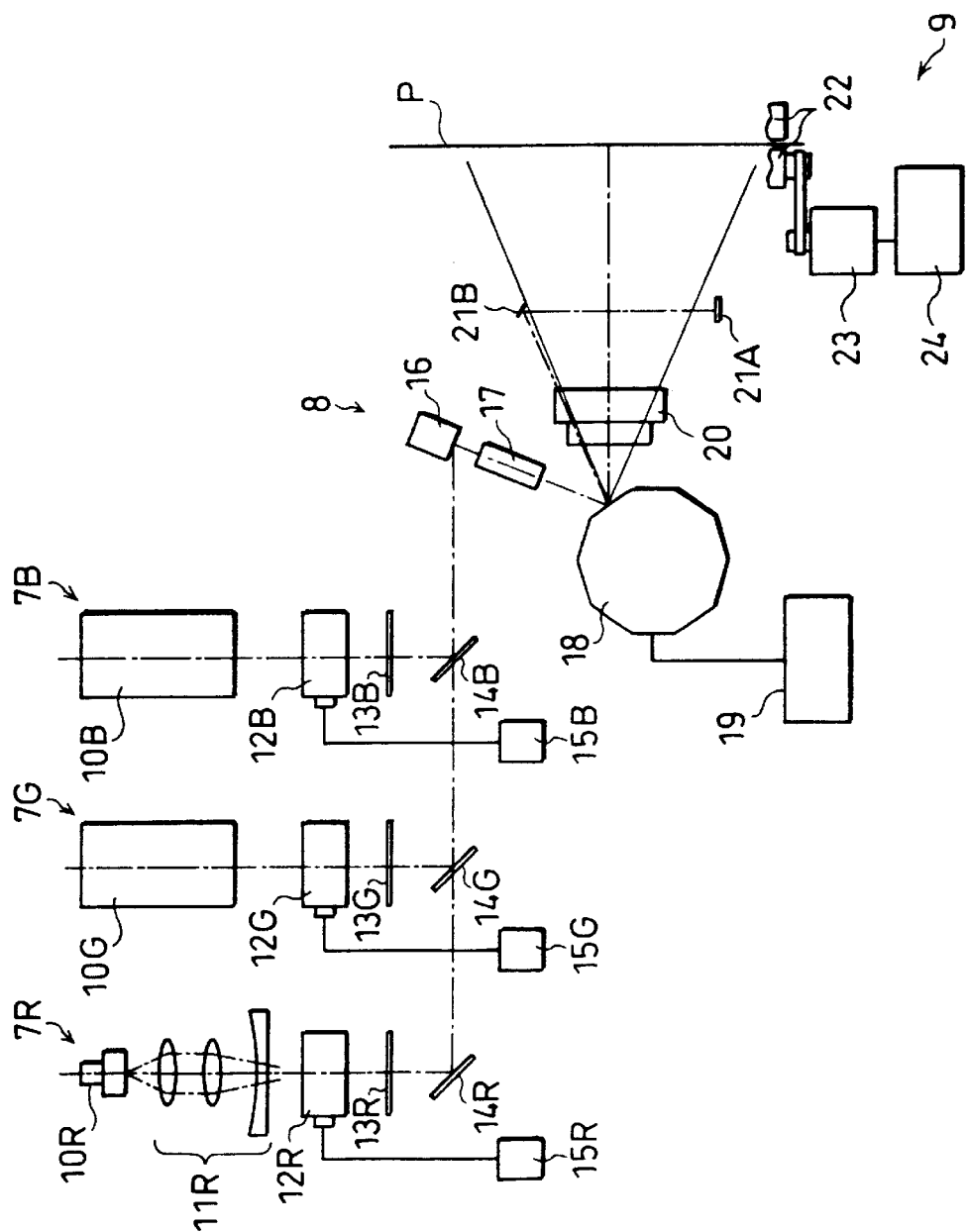
FIG. 4 is an explanatory view illustrating a schematic structure of a printing section of the photographic processing device of FIG. 1.
Figure 6:
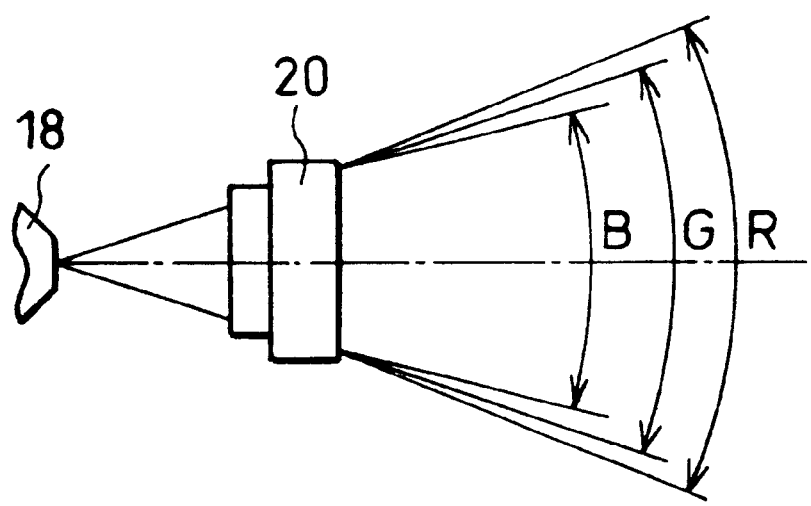
FIG. 6 is an explanatory view illustrating the state wherein in the printing section, light beams emitted from a polygon mirror, which have the same main scanning region respectively, have different main scanning regions after having passed through an fθ-lens.

The foregoing phenomenon occurs also in the structure illustrated in FIG. 4, and even if the respective main scanning regions of the laser beams in respective colors emitted from the polygon mirror 18 onto the fθ-lens 20 are the same, after these laser beams have passed through the fθ-lens 20, the respective main scanning regions would be displaced one another. FIG. 6 is an explanatory view schematically illustrating the foregoing phenomenon, in which the light beams in respective colors R, G, and B as emitted from the polygon mirror 18 in the same main scanning regions have different main scanning regions after being transmitted through the fθ-lens 20. In this case, the light beams in respective colors for the same pixel are projected in different positions on the printing sheet P, which results in shift in colors. Further, with this shift in colors, unwanted color appears in the print image, which significantly lowers the quality of the print image. It should be noted here that the foregoing explanations on the main scanning regions for the respective colors, R, G, and B, shown in FIG. 6 have been given as merely one example, and the main scanning regions may be varied to be suited for the characteristics of an fθ-lens.

In the present embodiment, the foregoing shift in the main scanning regions is suppressed by adjusting an exposure/scanning clock (reference clock) of the image data to be input to the AOM drivers 15R, 15G and 15B for each color.

Figure 1:
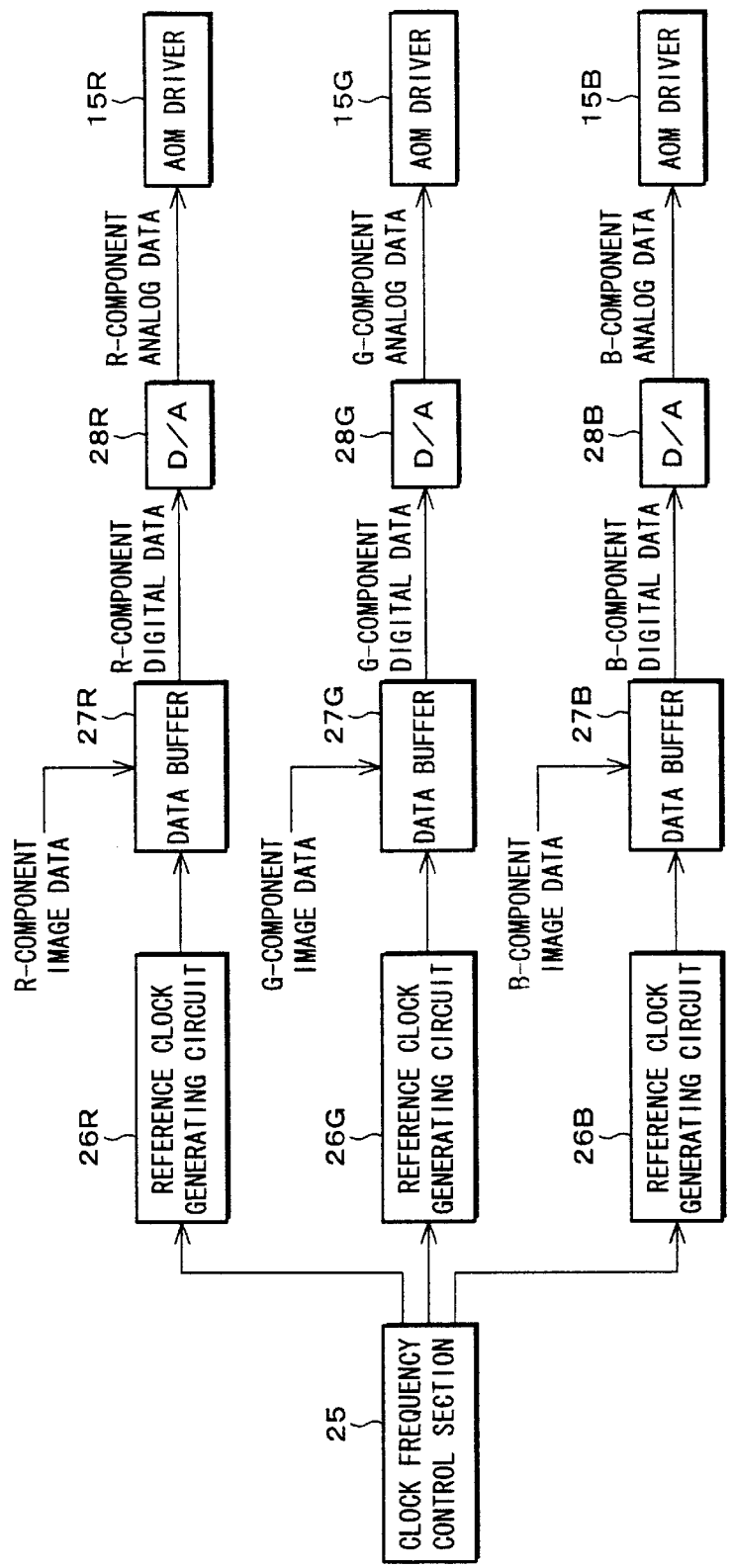
FIG. 1 is a block diagram illustrating a schematic structure of a data input section with respect to an AOM driver for modulating laser beams in respective colors in a photographic processing device in accordance with one embodiment of the present invention.

FIG. 1 is a block diagram illustrating the schematic structure of a data input section with respect to the AOM drivers, 15R, 15G, and 15B adopted in the present embodiment. As illustrated in FIG. 1, to the AOM driver 15R, connected are a reference clock generating circuit 26R, a data buffer 27R, and a D/A converter 28R; to the AOM driver 15G, connected are a reference clock generating circuit 26G, a data buffer 27G, and a D/A converter 28G; and to the AOM driver 15B connected are a clock generating circuit 26B, a data buffer 27B, and a D/A converter 28B, respectively. Further, to the reference clock generating circuits 26R, 26G, and 26B, connected is a clock frequency control section (timing control means) 25.

The clock frequency control section 25 is a block for controlling and setting the reference clocks for respective color components R, G, and B. From this clock frequency control section 25, data signals of different reference clocks are output to the reference clock generating circuits 26R, 26G, and 26B.

The reference clock generating circuits 26R, 26G, and 26B serve as blocks for outputting respective reference clocks, which have been adjusted based on the data signals of the reference clocks as received from the clock frequency control section 25, to the data buffers 27R, 27G, and 27B.

The data buffers 27R, 27G, and 27B are memories for temporarily storing the image data for the respective color components R, G, and B, and the data buffers 27R, 27G, and 27B also serve as blocks for outputting the image data for one pixel in synchronous with the reference clocks as received from the reference clock generating circuit 26R, 26G, and 26B.

The D/A converters 28R, 28G, and 28B serve as blocks for converting digital data as input from the data buffers 27R, 27G, and 27B, into analog data. The analog data for the respective color components R, G, and B are input to the AOM drivers 15R, 15G, and 15B.

In the foregoing structure of the present embodiment, it is possible to adjust for respective colors the reference clocks of the image data to be input to the AOM drivers 15R, 15G, and 15B.

Next, the operation of controlling the reference clocks to be adjusted for respective color components R, G and B to be performed by the clock frequency control section 25 will be explained. As described earlier, according to the structure of the present embodiment, the reference clocks of image data to be input to the AOM drivers 15R, 15G, and 15B adjusted to be suited for respective color components R, G, and B are adopted, so as to suppress the foregoing shift in the main scanning regions. Specifically, in the present embodiment, a shift in the main scanning regions is suppressed by setting the reference clocks in the following manner.

Figure 7:
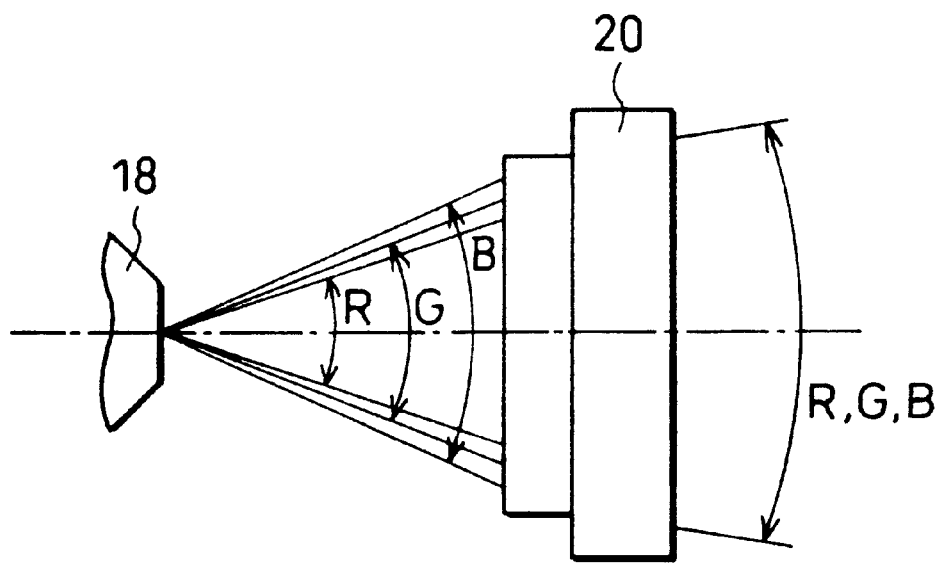
FIG. 7 is an explanatory view illustrating the main scanning regions of laser beams in respective colors, emitted from the polygon mirror, which have passed through the fθ-lens when scanning using a reference clock adjusted for each color R, G, and B.

FIG. 7 is an explanatory view illustrating main scanning regions for the laser beams in respective colors as reflected from the polygon mirror 18 and then transmitted through the fθ-lens 20 when performing a scanning operation using the reference clocks as adjusted in the foregoing manner. As shown in FIG. 7, when adopting the reference clocks as adjusted for respective colors R, G, and B, the laser beams in respective colors have different main scanning regions between the polygon mirror 18 and the fθ-lens 20. However, it can be seen from FIG. 7 that the main scanning regions for respective colors again coincide one another after being transmitted through the fθ-lens 20.

In the example shown in FIG. 7, the laser beam for the blue-color component (B) has the minimum reference clock frequency, and larger reference clock frequencies are set for the green-color component (G) and the red-color component (R) in this order. It is also arranged such that a scanning operation in the main scanning direction with the laser beam for the blue-color component at an earliest timing, followed by the scanning operation with the laser beam for the green-color component and the scanning operation with the laser beam for the red-color component in this order.

By setting the reference clock frequencies and the scanning start timings for respective colors in the foregoing manner, it is possible to form the main scanning region for the laser beams for respective color components to be symmetrical about the optical axis at the center which passes through the polygon mirror 18, the fθ-lens 20, and the printing sheet P.

The respective values to be set for the reference clocks for the laser beams in the respective colors may be adjusted, for example, in the following manner. First, a test printing operation is performed by printing an image in the sample pattern onto the printing sheet P, and the resulting shift in pixel of the print image is observed. Then, based on the shift in pixel as observed, each reference clock is adjusted, and using reference clocks as adjusted, a test printing operation is performed again, and the resulting shift in pixel of the print image is observed. If a shift in pixel is still observed from this second test printing operation, a further test printing operation is to be performed based on reference clocks further adjusted reflecting the result of the second test printing operation. Namely, the foregoing test printing operation is repeated until no more shift in pixel is observed, thereby setting suitable reference clocks for the laser beams in respective colors.

Alternatively, the respective reference clocks may be adjusted using a large number of photosensors provided at position corresponding to the exposed position of the printing sheet P. Specifically, the reference clocks are adjusted by feeding back the results of detection by the photosensors to the clock frequency control section 25. In this way, the reference clocks can be adjusted in a shorter period of time without the need of exposing the printing sheet. However, in view of the fact that the foregoing adjustment of the reference clocks is not required frequently, it may be more of a disadvantage accompanied by the cost increase for the provision of such larger number of photosensors and the feedback loop.

It should be noted here that the main scanning regions for the respective colors, R, G, and B, shown in FIG. 7 have been given merely as one example, and the main scanning regions of the present invention may be varied to be suited for the characteristics of an fθ-lens.

As described, the printing section 6 of the present embodiment performs a scanning/exposing operations by i) modulating a plurality of light beams having different wavelengths, respectively projected from the light source sections 7R, 7G, and 7B, according to image data by the AOM 12R, 12G, and 12B, ii) deflecting the light beams in the main scanning direction by the polygon mirror 18, and iii) converging the light beams on the printing sheet P via the fθ-lens 20. Further, the clock frequency control section 25 individually controls the reference clocks for the AOM 12R, 12G, and 12B. Thus, even when a shift in projection point on the printing sheet P occurs among light beams in respective colors corresponding to the same pixel, the projection point can be suitably adjusted by adjusting the reference clock in each AOM by the clock frequency control section 25. As a result, it is possible to expose a quality image on the printing sheet P free from a shift in colors.

Figure 8:
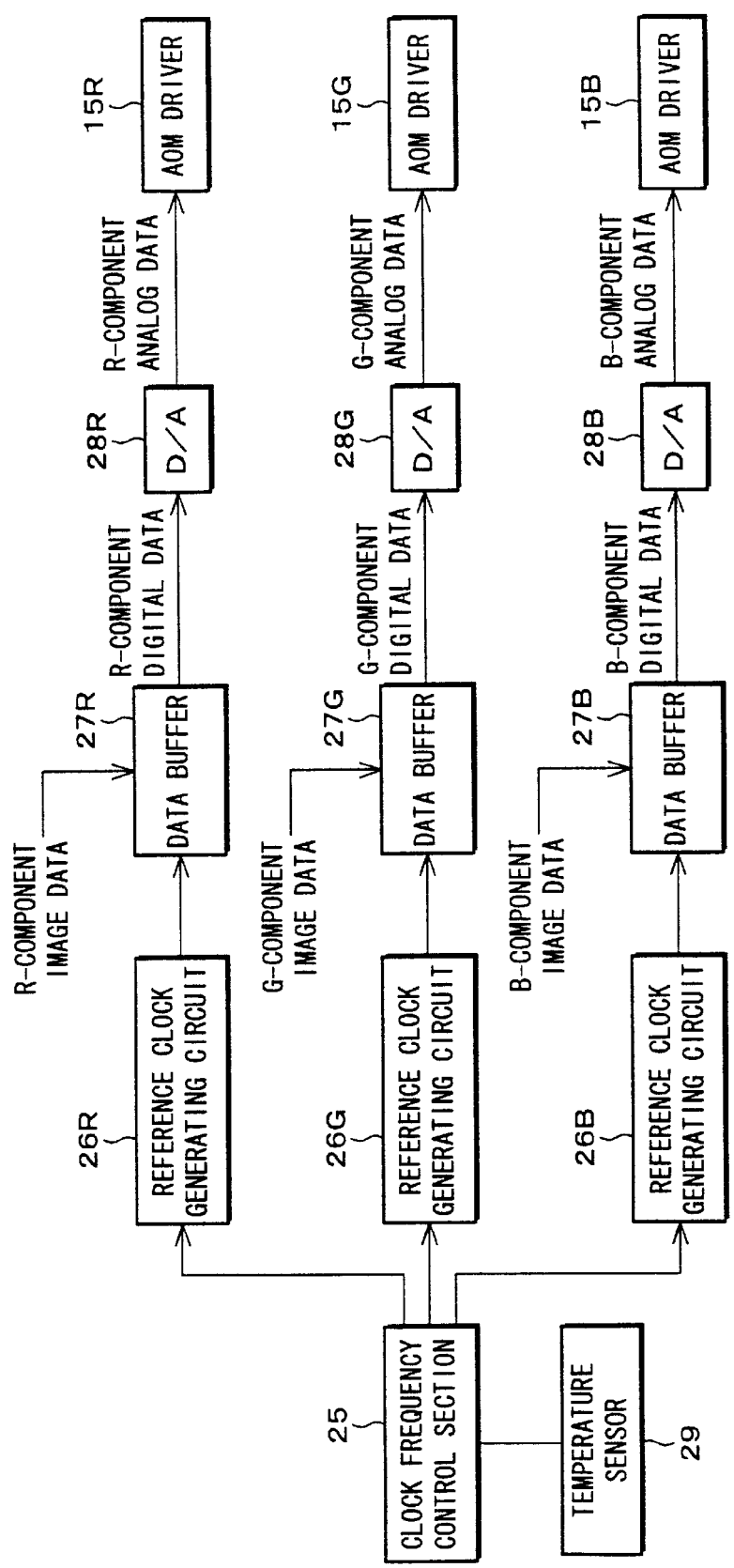
FIG. 8 is a block diagram illustrating a data input section with respect to the AOM driver illustrated in FIG. 1 wherein a temperature sensor is connected to a clock frequency control section.

The following will explain a structure in which a temperature sensor 29 is connected to the clock frequency control section 25, in the structure of the data input section for the AOM drivers 15R, 15G, and 15D shown in FIG. 1, with reference to a block diagram of FIG. 8.

The temperature sensor 29 measures ambient temperature of the device, in particular, the red LD 10R, the green SHG laser unit 10G, and the blue SHG laser unit 10B. The result of measurement by the temperature sensor 29 is transferred to the clock frequency control section 25, which, in turn, changes the reference clock for each color component according to the result of measurement.

Semiconductor lasers such as the red LD 10R, or solid lasers such as those provided in the green SHG laser unit 10G and the blue SHG laser unit 10B have such characteristic that the wavelength of a laser light emitted therefrom is slightly changed with a change in ambient temperature. Thus, this change in wavelength with a change in temperature causes a change in refractive index of the fθ-lens 20 for the laser beam in each color transmitted therethrough, resulting in shift in the main scanning region. Namely, the structure of FIG. 1 is effective for suppressing shift in color when the ambient temperature is in the vicinity of a specific temperature; however, it is not effective when the ambient temperature shows a large change, and shift in color would remain in the print image.

In response, according to the structure of FIG. 8, the values for the reference clocks to be set by the clock frequency control section 25 are adjusted according to the result of measurement by the temperature sensor 29. According to the foregoing structure, even when an ambient temperature changes, each reference clock can be suitably adjusted inflecting the change in temperature, and it is therefore possible to suppress a shift in colors.

The clock frequency control section 25 adjusts the reference clocks in consideration of ambient temperature, for example, in the following manner. First, the ambient temperature is classified into a plurality of temperature ranges, and then a suitable value for the reference clock is set for each color component to be suited for each temperature range, so that a shift in colors can be suppressed. Then, based on the result of detection by the temperature sensor 29, a suitable value for each reference clock is set to be suited for the ambient temperature as detected, and corresponding signals are output to the reference clock generating circuits 26R, 26G and 26B respectively. It should be noted here that the number of temperature ranges to be classified and the domain for each temperature range may be suitably adjusted so that a shift in colors can be surely suppressed in practice without further adjusting each reference clock within the same temperature range.

In foregoing preferred embodiment, the temperature sensor 29 which measures ambient temperatures of the red LD 10R, the green SHG laser unit 10G, and the blue SHG laser unit 10B is adopted. However, the temperature sensor of the present invention is not limited to the foregoing, and it may be arranged so as to provide a sensor for detecting temperature of the light emitting section for each of the red LD 10R, the green SHG laser unit 10G, and the blue SHG laser unit 10B. In this case, the reference frequency control section 25 sets each reference clock based on the results of measurement by these three sensors.

As described, the optical scanning device in accordance with the present invention which performs an exposing operation by scanning with respect to a photosensitive material being moved relatively is arranged so as to include:

a plurality of light sources for projecting light beams respectively having different wavelengths;

a plurality of light beam modulation means for modulating the light beams projected from respective light sources according to image data;

timing control means for controlling a modulation timing for each of the plurality of light beam modulation means;

deflecting means for deflecting the light beams modulated by the light beam modulation means in a main scanning direction; and optical means for converging a light beam emitted from the deflecting means onto the photosensitive material, wherein the timing control means controls a modulation timing for each of the plurality of light beam modulation means individually.

The foregoing optical scanning device may be arranged such that the timing control means controls a scanning clock in each of the plurality of light beam modulation means.

According to the foregoing arrangement, the modulation timing of the light beam modulation means is controlled by controlling a scanning clock, which can be controlled relatively with ease. It is therefore possible to accurately control the modulation timing, and in the meantime, an increase in cost of the device can be minimized.

Further, the foregoing optical scanning device may be arranged so as to include:

environmental condition detection means for detecting an environmental condition, wherein the timing control means controls a modulation timing of each of the plurality of light beam modulation means based on a result of detection by the environmental condition detection means.

According to the foregoing arrangement, the modulation timing of each light beam modulation means can be adjusted according to the result of detection by the environmental condition detection means. Thus, even when a shift in projection point on the photosensitive material occurs due to a change environmental condition, the projection point can be suitably adjusted by adjusting the modulation timing of each light beam modulation means. That is, it is possible to expose a quality image free from shift in colors on the photosensitive material irrespectively of a change in environmental condition.

Further, the foregoing optical scanning device may be arranged such that the environmental condition detection means is a temperature sensor for detecting temperatures.

For example, when a semiconductor laser or a solid laser is adopted for a light source, such light source has such characteristic that the wavelength of a laser light emitted therefrom is slightly changed with a change in temperature. Further, a material such as glass, etc., used in the optical components has a variable refractive index depending on a wavelength of a light beam transmitted therethrough. In view of the foregoing, by detecting a temperature which is the main cause for a shift in projection point of the light beam, so as to adjust the modulation timing of each light beam modulation means according to the result of detection, it is possible to expose a quality image free from shift in colors onto a photosensitive material.

The invention being thus described, it will be obvious that the same may be varied in many ways. Such variations are not to be regarded as a departure from the spirit and scope of the invention, and all such modification as would be obvious to one skilled in the art are intended to be included within the scope of the following claims.

What is claimed is:

1. An optical scanning device which performs an exposing operation by scanning with respect to a photosensitive material being moved relatively, said optical scanning device, comprising:

a plurality of light sources for projecting light beams respectively having different wavelengths;

a plurality of light beam modulation means for modulating the light beams projected from respective light sources according to image data;

timing control means for controlling a modulation timing for each of said plurality of light beam modulation means;

deflecting means for deflecting the light beams modulated by said plurality of light beam modulation means in a main scanning direction; and optical means for converging a light beam from said deflecting means onto the photosensitive material, wherein said timing control means controls a modulation timing for each of said plurality of light beam modulation means individually, said timing control means controlling a scanning clock in each of said plurality of light beam modulation means, and said timing control means controlling modulation timing in such a manner that a scanning clock having a smaller frequency is set for a light beam having a wavelength corresponding to a larger refractive index of said optical means.

2. The optical scanning device as set forth in claim 1, further comprising:

environmental condition detection means for detecting an environmental condition, wherein said timing control means controls a modulation timing of each of said plurality of light beam modulation means based on a result of detection by said environmental condition detection means.

3. The optical scanning device as set forth in claim 2, wherein:

said environmental condition detection means is a temperature sensor for detecting temperatures.

4. The optical scanning device as set forth in claim 1, wherein:

said timing control means controls a modulation timing for each of said plurality of light beam modulation means individually in such a manner that respective main scanning regions of the light beams in respective colors on said photosensitive material coincide with one another.

5. The optical scanning device as set forth in claim 1, wherein:

said optical means is a fθ-lens composed of a plurality of lens.

6. The optical scanning device as set forth in claim 1, wherein:

said deflecting means is a polygon mirror which is a rotating member wherein a plurality of reflective surfaces form a regular polygon.

7. The optical scanning device as set forth in claim 1, wherein:

said light source is a laser diode.

8. The optical scanning device as set forth in claim 1, wherein:
said light source is an SHG (Second Harmonic Generation) laser.

9. The optical scanning device as set forth in claim 1, wherein:
said plurality of light beam modulation means are AOMs (Acousto-Optic Modulators).

10. The optical scanning device as set forth in claim 1, wherein:
said plurality of light beam modulation means directly modulate respective outputs of light beams projected from said light sources.

11. An electrophotographic processing device, comprising:
an optical scanning device which includes:
a plurality of light sources for projecting light beams having different wavelengths respectively;
a plurality of light beam modulation means for modulating the light beams projected from said plurality of light sources respectively according to image data;
deflecting means for deflecting the light beams modulated by said plurality of light beam modulation means respectively in a main scanning direction; and
optical means for converging a light beam from said deflecting means onto the photosensitive material,
wherein said timing control means individually controls respective modulation timings for said plurality of light beam modulation means, said timing control means controlling a scanning clock in each of said plurality of light beam modulation means, and said timing control means controlling modulation timing in such a manner that a scanning clock having a smaller frequency is set for a light beam having a wavelength corresponding to a larger refractive index of said optical means;
a developing section which performs a developing operation with respect to the photosensitive material which have gone through a printing process by said optical scanning device using a developing solution; and
a drying section for drying the developing material having gone through the developing process by said developing section.

12. An optical scanning device which performs an exposing operation by scanning with respect to a photosensitive material being moved relatively, said optical scanning device, comprising:
a plurality of light sources for projecting light beams respectively having different wavelengths;
a plurality of light beam modulation means for modulating the light beams projected from respective light sources according to image data;
timing control means for controlling a modulation timing for each of said plurality of light beam modulation means;
deflecting means for deflecting the light beams modulated by said plurality of light beam modulation means in a main scanning direction; and
optical means for converging a light beam from said deflecting means onto the photosensitive material,
wherein said timing control means controls a modulation timing for each of said plurality of light beam modulation means individually, said timing control means controlling modulation timing in such a manner that an earlier scanning timing is set for a light beam having a wavelength corresponding to a larger refractive index of said optical means.

13. The optical scanning device as set forth in claim 12, wherein:
said timing control means controls a scanning clock in each of said plurality of light beam modulation means.

14. The optical scanning device as set forth in claim 12, further comprising:
environmental condition detection means for detecting an environmental condition,
wherein said timing control means controls a modulation timing of each of said plurality of light beam modulation means based on a result of detection by said environmental condition detection means.

15. The optical scanning device as set forth in claim 14, wherein:
said environmental condition detection means is a temperature sensor for detecting temperatures.

16. The optical scanning device as set forth in claim 12, wherein:
said timing control means controls a modulation timing for each of said plurality of light beam modulation means individually in such a manner that respective main scanning regions of the light beams in respective colors on said photosensitive material coincide with one another.

17. The optical scanning device as set forth in claim 12, wherein:
said optical means is a fθ-lens composed of a plurality of lenses.

18. The optial scanning device as set forth in claim 12, wherein:
said deflecting means is a polygon mirror which is a rotating member wherein a plurality of reflective surfaces form a regular polygon.

19. The optical scanning device as set forth in claim 12, wherein:
said light source is a laser diode.

20. The optical scanning device as set forth in claim 12, wherein:
said light source is an SHG (Second Harmonic Generation) laser.

21. The optical scanning device as set forth in claim 12, wherein:
said plurality of light beam modulation means are AOMs (Acousto-Optic Modulators).

22. The optical scanning device as set forth in claim 12, wherein:
said plurality of light beam modulation means directly modulate respective outputs of light beams projected from said light sources.

23. An optical scanning method for an optical scanning device which performs an exposing operation by scanning with respect to a photosensitive material being moved relatively, comprising the steps of:
providing a plurality of light sources for projecting light beams having different wavelengths respectively;
modulating the light beams projected from said plurality of light sources with a plurality of light beam modulation means respectively according to image data;
controlling the modulation timing for each of said plurality of light beam modulation means with a timing control means that controls a scanning clock in each of said plurality of light beam modulation means;
deflecting with a deflecting means said light beams modulated by said plurality of light beam modulation means respectively in a main scanning direction; and converging with optical means a light beam from said deflecting means onto the photosensitive material;

wherein said timing control means controls modulation timing in such a manner that a scanning clock having a smaller frequency is set for a light beam having a wavelength corresponding to a larger refractive index of said optical means.

24. An optical scanning method for an optical scanning device which performs an exposing operation by scanning with respect to a photosensitive material being moved relatively, comprising the steps of:

providing a plurality of light sources for projecting light beams having different wavelengths respectively;

modulating the light beams projected from said plurality of light sources with a plurality of light beam modulation means respectively according to image data;

controlling the modulation timing for each of said plurality of light beam modulation means with a timing control means;

deflecting with a deflecting means said light beams modulated by said plurality of light beam modulation means respectively in a main scanning direction; and converging with optical means a light beam from said deflecting means onto the photosensitive material;

wherein said timing control means controls modulation timing in such a manner that an earlier scanning timing is set for a light beam having a wavelength corresponding to a larger refractive index of said optical means.

25. An electrophotographic processing device, comprising:

an optical scanning device which includes:
  a plurality of light sources for projecting light beams having different wavelengths respectively;
  a plurality of light beam modulation means for modulating the light beams projected from said plurality of light sources respectively according to image data;
  deflecting means for deflecting the light beams modulated by said plurality of light beam modulation means respectively in a main scanning direction; and
  optical means for converging a light beam from said deflecting means onto the photosensitive material, wherein said timing control means individually controls respective modulation timings for said plurality of light beam modulation means, said timing control means controlling modulation timing in such a manner that an earlier scanning timing is set for a light beam having a wavelength corresponding to a larger refractive index of said optical means;

a developing section which performs a developing operation with respect tot he photosensitive material which have gone through a printing process by said optical scanning device using a developing solution; and a drying section for drying the developing material having gone through the developing process by said developing section.

* * * * *